Sept. 11, 1923.
J. P. COUGHLIN
WRENCH
Original Filed Oct. 4, 1919
1,467,709
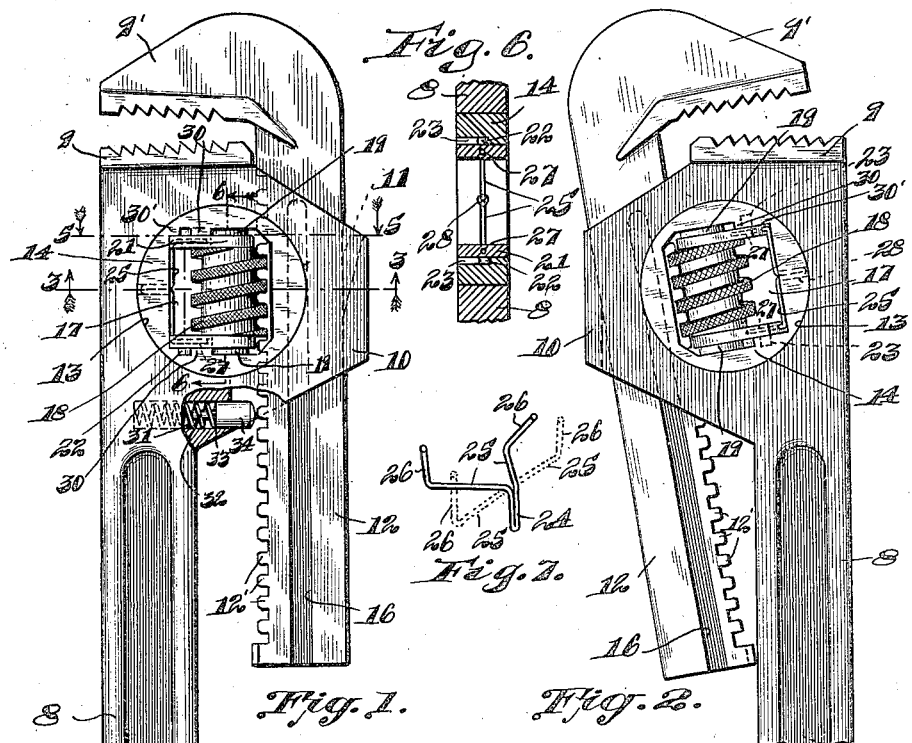
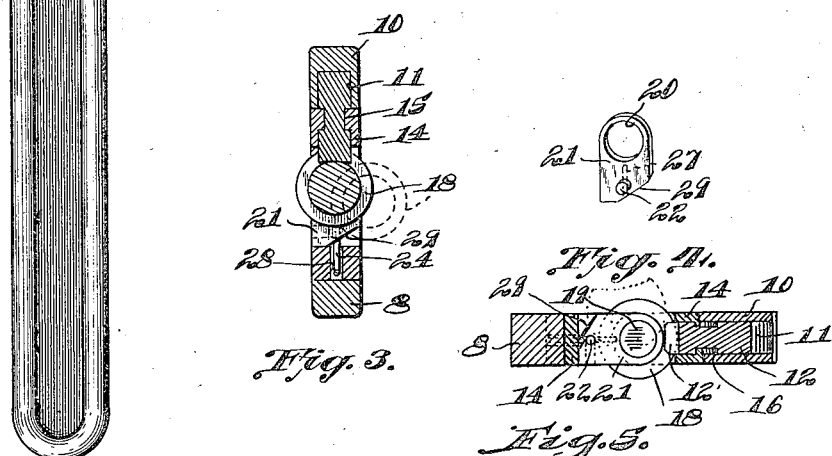
Witnesses:
C. E. Wessels.
Thos. S. Donnelly
Inventor:
John P. Coughlin,
By Joshua R. H. Potts
Attorney.

Patented Sept. 11, 1923.

1,467,709

UNITED STATES PATENT OFFICE.

JOHN PATRICK COUGHLIN, OF CHICAGO, ILLINOIS.

WRENCH.

Application filed October 4, 1919, Serial No. 328,548. Renewed July 14, 1923.

*To all whom it may concern:*

Be it known that I, JOHN PATRICK COUGHLIN, a citizen of the United States, and a resident of the city of Chicago, county of Cook, and State of Illinois, have invented certain new and useful Improvements in Wrenches, of which the following is a specification.

My invention relates to new and useful improvements in wrenches and has for its object the provision of a wrench which may be easily and quickly adjusted to different sizes.

Other objects will appear hereinafter.

The invention consists in the combinations and arrangements of parts hereinafter described and claimed.

The invention will be best understood by reference to the accompanying drawings forming a part of this specification, and in which, Fig. 1 is a side elevation of a wrench embodying my invention, with a part removed.

Fig. 2 is a fragmentary side elevation of a wrench embodying my invention.

Fig. 3 is a transverse sectional view taken on substantially line 3—3 of Fig. 1.

Fig. 4 is a perspective view of the nut holder used in my invention.

Fig. 5 is a transverse sectional view taken on substantially line 5—5 of Fig. 1.

Fig. 6 is a vertical sectional view taken on substantially line 6—6 of Fig. 1.

Fig. 7 is a perspective view of the spring used in my invention.

The approved form of construction comprises a wrench having a shank 8, on the upper end of which is formed a jaw 9. Projecting laterally from the shank 8 is a portion 10 having a passage 11 extending therethrough for the reception of the shank 12, on the upper end of which is formed a jaw 9', which is adapted to cooperate with the jaw 9. Formed in the member 8 and partly in the member 10, is a circular opening 13, into which is adapted to be inserted a nut case 14, one side of which is bifurcated. The bifurcated portions have formed thereon an inwardly projecting shoulder 15 which is adapted to engage in the groove 16 formed in the member 12. Provided in the nut case 14 is an opening 17 in which a spiral nut 18 is adapted to be inserted, the spiral threads on said nut meshing with the teeth 12' formed on the member 12. At each end the member 18 has a reduced cylindrical portion which is adapted to be received in the opening 20 formed in the nut holders 21. Projecting from one surface of the nut holders 21 is a stud 22 which is adapted to engage in a slot 23 formed in the nut case 14. The members 21 are provided with a recess 27 projecting inwardly from the end, which is diagonally cut, as at 29, which is adapted to receive a portion 26 of a spring. Said spring, as shown in Fig. 7, comprises a main shank 24, consisting of a wire doubled upon itself and having portions 25 which are turned at right angles to the member 24 and disposed angularly to each other. The members 26 are also inclined toward the members 25, that is, they do not meet at right angles. In order to insert the nut into the nut case, the members 26 are inserted into the recess 27, and the member 24 is inserted into the recess 28 formed in the nut case 14. In order to insert the members 26 into the nut holders 21, it is necessary that the members 26 be flexed toward each other when the nut holders are parallel to each other, thereby placing the members 26 under tension. After the members 26 have been placed within the nut holders which are positioned upon the nut 18, it will also be necessary to flex the members 25 outwardly from each other, so that the spring members assume the position shown in dotted lines in Fig. 7. Consequently, the members 25 are continually under strain. The nut, with the nut holders attached, is assembled from only one side of the nut case 14, that is, that side of the nut case in which the grooves 23 are formed.

The purpose of this construction is to afford a means of quickly adjusting the jaws 9 and 9' relatively to each other. When the nut has been assembled within the nut case, as described, by pressure of the thumb against the nut 18, the same may be pushed outwardly relatively to the nut case 14, so as to disengage from the teeth 12' formed on the shank 12. In pushing the nut outwardly, the spring members which are already under tension, are placed in greater tension, so that there is a tendency to restore the nut 18 to its position of engagement or meshing with the teeth 12'. The nut holders are cut diagonally, as at 29, for the purpose of allowing this swinging pivotal movement. When the nut holders engage against the nut case along the edges 29, further movement of the nut 18 outwardly is prevented. As will be readily understood, the nut holders swing upon the studs 22 as a pivot, the portions 26 of the spring member serving to retain the nut holders in close engagement with the surface of the nut case and thereby to retain the members 22 within the grooves or recesses 23. In this formation, as clearly shown in Fig. 1 and Fig. 2, a shoulder 30 is formed upon which the nut holder rests, as well as upon the portion 30'. Provided in the member 8 is a recess 31, in which is positioned a spiral spring 32 embracing a reduced inwardly projecting portion 33 of a pin 34 which is seated in the recess 31. As shown in Fig. 2, the shank 12 may be inclined relatively to the shank 8. Upon inclining the shank 21 relatively to the shank 8, the member 34 is pressed inwardly, thereby compressing the spring 34. The result is that the member 34 tends to restore the member 12 to a position in which the same will be parallel with the member 8. This has special utility inasmuch as it is customary, in the use of a pipe wrench, to press the movable shank inwardly toward the stationary shank, thus providing a wider space between the outer ends of the jaws. Before the jaws will tightly grip the pipe inserted therebetween, it is necessary that the members be restored to a relative position more closely approximating a parallel one.

With a wrench constructed in the manner described, the adjustment of the jaws is very easily brought about by disengaging the nut 18 from the teeth 12'. Upon the proper adjustment having been arrived at, the nut 18 is restored to its meshing position with the teeth 12' by means of the spring members 25 and 24. It is also apparent that, on account of the nut case 14 being rotatably mounted in the circular opening 13, the nut 18 will mesh with the teeth 12', irrespective of the position of the member 12 relatively to the member 8.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:

1. A wrench comprising a shank having a stationary jaw at one end thereof; a movable jaw co-operating with said stationary jaw; a sleeve secured to said shank at one side thereof; a toothed shank secured to said movable jaw and extending through said sleeve parallel with said first mentioned shank; a circular nut case rotatably mounted in said sleeve and slidably engaging said toothed shank to permit rocking thereof in said sleeve; and a disengageable laterally movable spiral nut mounted in said circular nut case and normally operatively engaging said toothed shank, substantially as described.

2. A wrench comprising a shank having a stationary jaw at one end thereof; a movable jaw co-operating with said stationary jaw; a sleeve secured to said shank at one side thereof; a toothed shank secured to said movable jaw and extending through said sleeve parallel with said first mentioned shank; a circular nut case rotatably mounted in said sleeve and slidably engaging said toothed shank to permit rocking thereof in said sleeve; a spring mounted in said nut case; nut holders mounted on inwardly projecting portions of said spring; and a spirally threaded nut engaging at its opposite ends said nut holders and adapted to mesh with the teeth on said shank, substantially as described.

3. A wrench comprising a shank having a stationary jaw at one end thereof; a movable jaw co-operating with said stationary jaw; a sleeve secured to said shank at one side thereof; a toothed shank secured to said movable jaw and extending through said sleeve parallel with said first mentioned shank; a circular nut case rotatably mounted in said sleeve and slidably engaging said toothed shank to permit rocking thereof in said sleeve; a spring mounted in said nut case; nut holders mounted on inwardly projecting portions of said spring; a spirally threaded nut engaging at its opposite ends said nut holders and adapted to mesh with the teeth on said shank; and resilient means on said first mentioned shank normally retaining said toothed shank in parallel position relatively to said first mentioned shank, substantially as described.

4. A wrench comprising a shank having a stationary jaw; a movable jaw co-operating with said stationary jaw; a sleeve secured to said shank; a toothed shank secured to said movable jaw and projecting through said sleeve; a longitudinal groove in said toothed shank; a circular nut case rotatably mounted in said sleeve having a recess in its periphery; a shoulder in said recess slidably engaging the groove in said toothed shank and being movable therewith; and disengageable means for adjusting said toothed shank relatively to said first mentioned shank, substantially as described.

5. A wrench comprising a shank having a stationary jaw at one end thereof; a movable jaw cooperating with said stationary jaw; a sleeve mounted on said shank; a toothed shank secured to said movable jaw, slidably mounted in said sleeve and adapted to lie parallel with or inclined to said first mentioned shank; a circular nut case rotatably mounted in said first mentioned shank; a spring mounted in said nut case; nut holders mounted on inwardly projecting portions of said spring; and a spirally threaded nut engaging at its opposite ends said nut holders and adapted to mesh with the teeth on said shank, substantially as described., In testimony whereof I have signed my name to this specification in the presence of two subscribing witnesses.

JOHN PATRICK COUGHLIN.

Witnesses:
 HERBERT A. PIERSON,
 PETER B. COLLIS.